Oct. 30, 1956     E. W. REINSCH     2,768,748
SEPARATOR
Filed Nov. 3, 1953     2 Sheets-Sheet 1
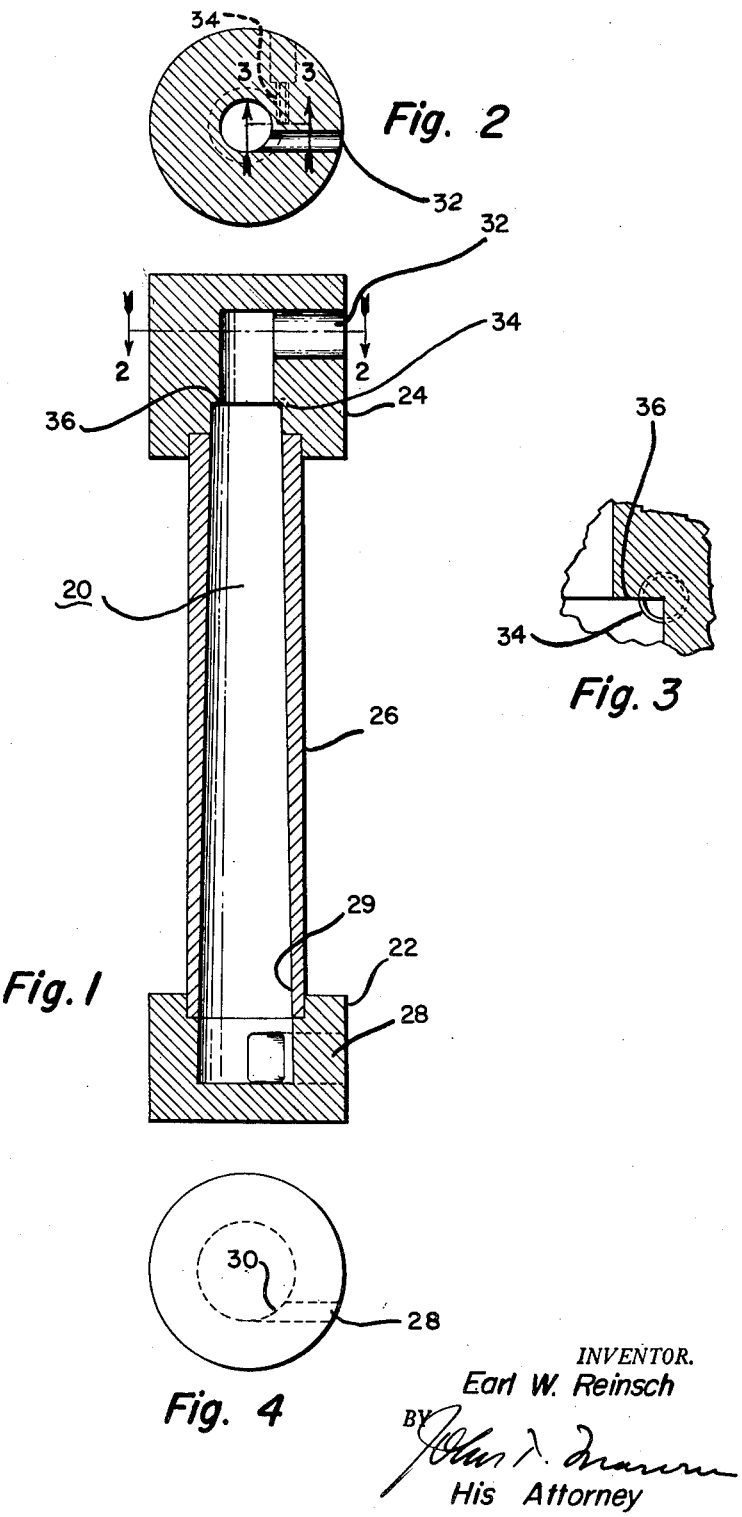
INVENTOR.
Earl W. Reinsch
BY
His Attorney

# United States Patent Office 2,768,748
Patented Oct. 30, 1956

2,768,748
SEPARATOR

Earl W. Reinsch, Dayton, Ohio, assignor to General Motors Corporation, Detroit, Mich., a corporation of Delaware Application November 3, 1953, Serial No. 389,979

5 Claims. (Cl. 210—51)

This invention relates to separators and is particularly concerned with an apparatus for separating solid particles of dirt and the like from a fluid vehicle.

It is, therefore, one object of the invention to provide a separator for removing extraneous solid matter from a fluid medium, such as dirt from oil. In carrying out this object, it is a further object to utilize a centrifugal principle for causing the dirt to be segregated and positively located with respect to a stream of dirty oil whereby the dirt may be removed from the oil.

Another object of the invention is to provide an oil cleaner for use in connection with an internal combustion engine wherein the cleaner is of the full flow type and wherein the dirty oil from the crankcase of the engine is forced through the cleaner under pressure and the dirt is removed therefrom centrifugally and collected in a settling tank while the clean oil is recirculated through the engine.

In carrying out the above object, it is a still further object to provide a vertical separator including an elongate cylindrical passage having an inlet at the lower end thereof and an outlet at the upper end. A tangentially disposed duct is provided at the upper end of the passage whereby dirt which has been centrifugally thrown against the outer side of the passage and circulated therearound is removed and wherein the main flow of oil passes through the outlet of the separator.

A still further object of the invention in certain cases is to cause the passage to be formed in an elongate truncated conical shape whereby the smaller diameter portion is adjacent the top thereof so that the velocity of the whirling oil or other fluid vehicle therein is increased as the fluid passes through the separator for increasing the centrifugal separating action thereof.

Further objects and advantages of the present invention will be apparent from the following description, reference being had to the accompanying drawings, wherein preferred embodiments of the present invention are clearly shown.

In the drawings:

Fig. 1 is a cross sectional view of a preferred type of oil separator.

Fig. 2 is a view in cross section taken on line 2—2 of Fig. 1.

Fig. 3 is a fragmentary cross sectional view taken on line 3—3 of Fig. 2.

Fig. 4 is a plan view of the bottom of the separator showing the inlet in dotted lines.

Figure 5:
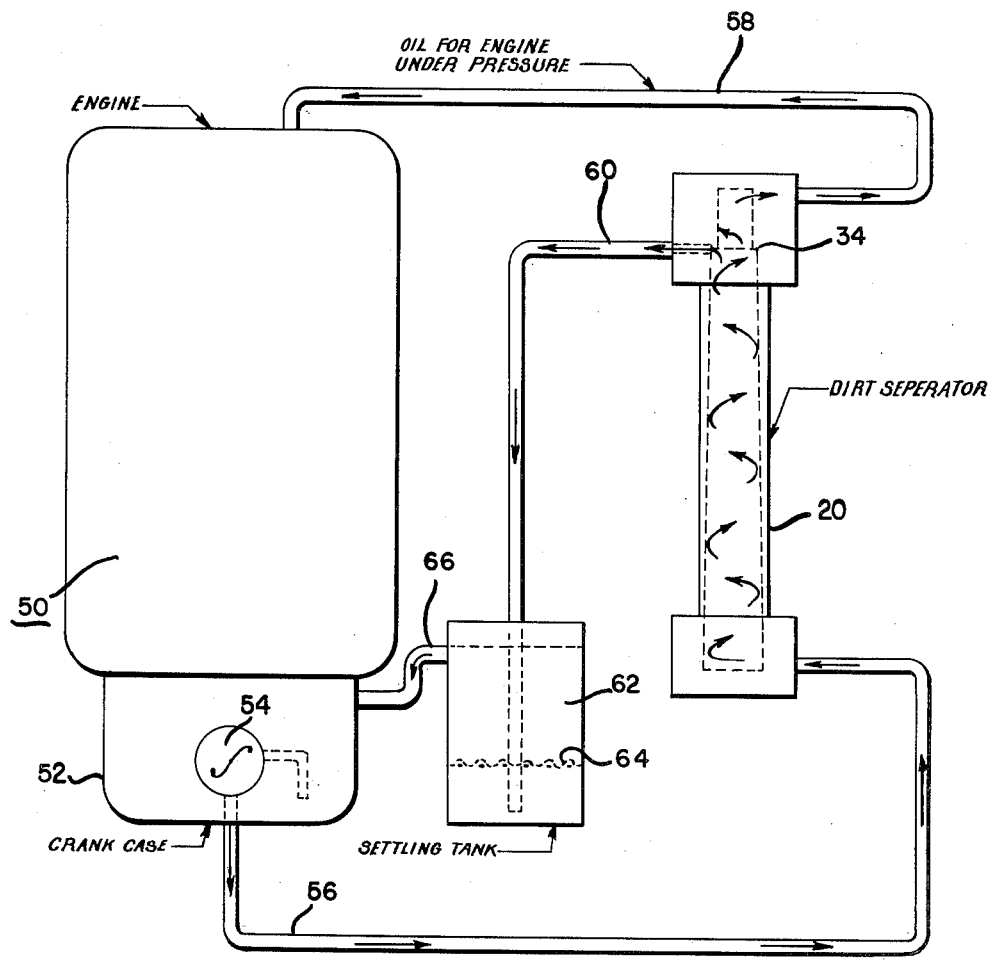
Fig. 5 is a diagrammatic view showing the separator in operative connection with an internal combustion engine lubricating system.

In the separation of extraneous material from fluid such as the separation of dirt from oil and the like, there have been many types of separators and filters proposed in order to carry out the function.

This is particularly true in the case of internal combustion engines where bypass filters are normally used which quickly clog and render the filter inoperative. In this connection, therefore, the bypass filter does not function for any extended period of time and, furthermore, when the bypass filter is functioning only a small proportion of the dirty oil passes therethrough.

There has long been a need for a full flow filter through which all of the lubricating oil of the engine may be passed and wherein the dirt may be separated from the oil. The drawback of this type of filter lies in the fact that since the entire oil supply is passing through the filter any permanent clogging thereof will cause permanent injury to the engine due to lack of lubrication thereby requiring additional valving for safety requirements. Therefore, it is highly desirable in a full flow filter or separator to have a device wherein clogging by dirt is impossible with respect to the main body of the oil which is being passed through the lubricating system. In this case, therefore, the lubrication of the engine is assured while dirt is continuously being removed from the lubricant and under extreme conditions, even if the separator portion of the device becomes clogged, the main oil flow is not impeded to the moving parts of the engine.

One of such separators is shown in my copending application Serial No. 214,413, now Patent No. 2,678,731, wherein a vertical type of separator is shown which operates on a centrifugal principle and which includes a spiral groove wherein the dirt collects and is eventually separated from the main body of the oil through a tangentially disposed removal duct which has a cross section less than the cross section of the main oil flow duct.

The present invention is an improvement on the separator shown in my copending application in that the collecting groove has been removed as has the central supporting column whereby in place of an annular channel through the separator, I now use a substantially cylindrical separating portion which may be of a truncated conical shape. In this improved type of separator, there is considerably less pressure drop, and, therefore, the separator is more adapted for use in the usual type of vehicle and, furthermore, due to the elimination of the groove, the efficiency of the device has been improved due to more ease of movement of the dirt particles.

Referring to the drawings, specifically to Fig. 1, the preferred form of my simplified separator is shown at 20 wherein a pair of end blocks 22 and 24 are used at either end of a tubular intermediate member 26. The end block 22 includes an inlet 28 peripherally threaded for a compression fitting connection, which inlet joins the base of the cylindrical oil column 29 tangentially as shown at 30 in Fig. 4. The upper end of the cylindrical portion 26 is closed by end block 24 which includes a tangentially disposed outlet 32 as noted in Fig. 2 and also includes a tangentially disposed dirt removing outlet 34. The dirt removing outlet 34 is tangentially disposed within the cylindrical interior 29 of the intermediate portion 26 at right angles to the outlet 32 as clearly shown in Fig. 2 and joins the cylindrical inner portion 29 of the separator at a stepped portion 36 thereof so that only approximately a ¼ or one quadrant of the outlet 34 is open to the column 29. This particular construction is clearly shown in Fig. 3.

In operation of the device, oil passed into the column 29 through inlet 28 is caused to swirl due to the tangential disposition of the inlet and to the pressure under which the oil is supplied to the separator. This swirling continues as the oil passes upwardly through the intermediate portion 26 and during this time dirt particles which are heavier than the main body of the oil are centrifugally thrown outwardly against the cylindrical walls of the portion 29, and are carried upwardly due to the general movement of the main body of the oil. When these dirt particles reach the step 34 their upward progress is impeded although their swirling motion continues until such time as they reach the open quadrant of the dirt outlet 34 through which they are thrown and passed, the main body of the oil escaping through the separator from the main outlet 32. Thus upon each pass of the oil through the separator, a portion of the dirt therein is separated therefrom.

In order to overcome the tendency toward slowing up of the swirling action of the oil due to the wall friction of the separator, I prefer to taper the inner wall of the column 29 inwardly toward the top thereof as shown in the drawing in Fig. 1 This causes the column 29 to take the shape of an elongated truncated cone. This particular shape improves the separation since the ever-decreasing diameter of the column 29 causes an increase of the speed of the whirling particles, which increase fully compensates for the loss of speed due to friction and maintains the particles adjacent the wall of the column 29 at all times. It is understood in this connection that where substantial oil pressures are utilized it may not be necessary to provide this truncated conical shape although under most conditions, it is preferred due to the improvement in efficiency of the system.

The separator may be used in any of the usual internal combustion engines wherein a hookup, as shown in diagram in Fig. 5, is preferably used. In Fig. 5, 50 designates an engine having a crankcase 52 including an oil pump 54 therein. The oil from the crankcase is pumped by pump 54 through a duct 56 into the dirt separator 20 whence the main body of the oil emerges through duct 58 and into the engine 50. That portion of the oil which includes the dirt is removed through the dirt outlet 34 of the separator 20, passes through a duct 60 into a sump 62, which preferably includes a screen 64 therein. This maintains the dirt particles separated from the oil. As dirt and oil pass into the sump 62, the dirt is maintained in the bottom of the sump while the oil gradually fills the same and then overflows by a gravity through the duct 66 back to the crankcase while the dirt is maintained in the sump. The dirt may be periodically cleaned from the sump to maintain the system effective. This sump may be included in the crankcase if desired.

It is apparent in this setup that even if the sump gets full of dirt or the duct 60 becomes clogged, there is no danger of insufficient lubrication to the engine since the main body of the oil is passing through a completely open separator and through ducts of sufficient size to assure continuous flow to the moving parts of the engine.

In order to assure a tangential dirty oil outlet, I prefer to bottom drill a hole therefor at the shoulder and insert a thin wall tube through which the dirt may pass. The inlet passage 28 is preferably rectangular in shape with the longer dimension being parallel to the axis of the separating chamber, thus improving the action of the separator. The size of the opening should be maintained as small as possible compatible with pressure drop limitations. This will yield maximum velocity to the fluid being introduced. One specific form of the apparatus contemplates a separating chamber 7" long having a 1" inside diameter. In this connection, the ratio of diameter length should fall to within the range of 5 to 1 and 9 to 1 for satisfactory operation. The inlet for this sized chamber is 3/16 by 1/2" to give an area of .085 square inch. The ratio of length to width in the inlet should not be less than 2 to 1. The exposed area of the quadrant of the dirt removing tube is .005 square inch. In order to prevent reduction of velocity in the unit of this type, the I. D. of the chamber was tapered from 1" at the bottom to 3/4" diameter at the top for a reduction of 1/4" in diameter in 7" in overall length. This particular set of figures yielded a very efficient filter. The outlet is preferably of an area slightly larger than the inlet to prevent any back pressure within the separating chamber and may be of any desired shape. Both inlet and outlet should preferably be rounded off at the wall of the cylinder to reduce eddy currents, etc.

While the embodiments of the present invention as herein disclosed, constitute preferred forms, it is to be understood that other forms might be adopted.

What is claimed is as follows:

1. A separator for separating solid particles from a fluid medium comprising, in combination; an elongated smooth surfaced truncated passage adapted to be maintained in a substantially upright position, a closure member for the lower end of said passage, inlet means in said closure member entering said passage tangentially at the outer periphery thereof, a second closure for the upper end of said passage, an outlet at the upper end of said passage having a size at least equal to the inlet and leaving said passage tangentially thereof, a reduced diameter portion in said passage adjacent said outlet and between said outlet and said inlet for providing a shoulder in said passage, said shoulder having a tangentially disposed outlet therein comprising a duct having a smaller size than the outlet and entering said passage at substantially right angles to the position of said outlet.

2. A separator as claimed in claim 1, wherein said cylindrical passage has a length at least five times and not more than nine times the diameter thereof.

3. A separator as claimed in claim 1, wherein the inlet and outlet of the separator are elongated axially of the passage so that the vertically disposed dimension of both the inlet and the outlet is at least three times the width thereof.

4. A separator for separating the solid particles from a fluid medium comprising, in combination; an elongated smooth surfaced truncated conical passage adapted to be maintained in a substantially vertical position with the smaller diameter end of the cone uppermost, closure members for the upper and lower ends of said passage including inlet means at the lower end and outlet means at the upper end thereof, said inlet and outlet means entering the passage substantially tangentially at the outer periphery thereof, a shoulder in the upper closure member beneath said outlet, said shoulder including a dirt separating port therein which enters the passage tangentially thereof and at substantially right angles to the outlet, said inlet and outlet means to said passage being of substantially rectangular shape with the longer dimension in the vertical position and having a length to width ratio of at least 2 to 1, the length of said truncated conical passage being in the ratio of 5 to 1 of 9 to 1 to its width and having a taper in the order of from 1/25 to 1/30 of its length.

5. A separator as claimed in claim 4, wherein the dirt separating outlet includes a tube which passes tangentially into the passage beneath said shoulder and wherein about only 25% of the area of said tube is effective for removing dirt particles.

References Cited in the file of this patent

UNITED STATES PATENTS

| 1,576,108 | Fogler | Mar. 9, 1926 |
| 1,908,102 | Arledter | May 9, 1933 |
| 2,346,005 | Bryson | Apr. 4, 1944 |

FOREIGN PATENTS

| 306,954 | Germany | July 26, 1918 |
| 43,184 | France | Dec. 27, 1933 |